(12) United States Patent
Taherzadeh Boroujeni et al.

(10) Patent No.: US 11,974,334 B2
(45) Date of Patent: Apr. 30, 2024

(54) BUNDLE SIZE CONFIGURATION FOR DEMODULATION REFERENCE SIGNAL BUNDLING IN CASE OF UPLINK RANDOM ACCESS CHANNEL MESSAGE REPETITION

(71) Applicant: QUALCOMM Incorporated, San Diego, CA (US)

(72) Inventors: Mahmoud Taherzadeh Boroujeni, San Diego, CA (US); Hung Dinh Ly, San Diego, CA (US); Tao Luo, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 17/647,439

(22) Filed: Jan. 7, 2022

(65) Prior Publication Data
US 2022/0248476 A1 Aug. 4, 2022

Related U.S. Application Data

(60) Provisional application No. 63/144,211, filed on Feb. 1, 2021.

(51) Int. Cl.
*H04W 74/08* (2009.01)
*H04L 5/00* (2006.01)
(Continued)

(52) U.S. Cl.
CPC ....... *H04W 74/0841* (2013.01); *H04L 5/0051* (2013.01); *H04W 72/0446* (2013.01); *H04W 74/006* (2013.01); *H04W 74/0866* (2013.01)

(58) Field of Classification Search
CPC ......... H04W 74/0841; H04W 72/0446; H04W 74/006; H04W 74/0866; H04L 5/0051
See application file for complete search history.

(56) References Cited

U.S. PATENT DOCUMENTS

2022/0140947 A1* 5/2022 Takeda .................. H04L 1/1887
370/329

FOREIGN PATENT DOCUMENTS

WO WO-2022039959 A1 * 2/2022
WO WO-2022151868 A1 * 7/2022

OTHER PUBLICATIONS

CMCC: "Discussion on Coverage Enhancement for Channels Other than PUSCH and PUCCH", 3GPP TSG RAN WG1 #103-e, 3GPP Draft, R1-2008028, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 16, 2020 (Oct. 16, 2020), 2 Pages, XP051939441, Retrieved from the Internet: URL: https://ftp.3gpp.org/tsg_ran/WG1_RL1/TSGR1_103-e/Docs/R1-2008028.zip, [retrieved on Oct. 16, 2020] Section 2.

(Continued)

*Primary Examiner* — Chae S Lee
(74) *Attorney, Agent, or Firm* — Patterson + Sheridan, LLP

(57) ABSTRACT

Aspects of the present disclosure provide apparatuses, methods, processing systems, and computer readable mediums for determining, such as by a user equipment (UE), a bundle size for demodulation reference signal (DMRS) bundling for an uplink random access channel (RACH) message sent with repetition and transmitting the uplink RACH message with DMRS bundling according to the determined bundle size. For example, in some aspects of the present disclosure, the uplink RACH message is sent with a number of repetitions and the bundle size is determined as a function of the number of repetitions. In some aspects, the bundle size is determined based on operation band. In some aspects, the bundle size is determined, based on a duplexing mode in which the UE is operating. In some aspects, the bundle size (Continued)

is determined, at least in part, based on signaling from the base station.

21 Claims, 10 Drawing Sheets

(51) Int. Cl.
*H04W 72/0446* (2023.01)
*H04W 74/00* (2009.01)
*H04W 74/0833* (2024.01)

(56) References Cited

OTHER PUBLICATIONS

Huawei., et al., "Discussion on the Potential Coverage Enhancement Solutions for Other Channels", 3GPP TSG RAN WG1 Meeting #103-e, 3GPP Draft, R1-2007585, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 17, 2020 (Oct. 17, 2020), 4 Pages, XP051939802, Retrieved from the Internet: URL: https://ftp.3gpp.org/tsg_ran/WG1_RL1/TSGR1_103-e/Docs/R1-2007585.zip, [retrieved on Oct. 17, 2020], Section 4.

Intel Corporation: "Discussion on Joint Channel Estimation for PUSCH", 3GPP TSG RAN WG1 #104-e, 3GPP Draft, R1-2100667, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, pp. 1-7, Jan. 19, 2021 (Jan. 19, 2021), XP051971137.

Intel Corporation: "On Msg3 PUSCH Repetition", 3GPP TSG RAN WG1 #104-e, 3GPP Draft, R1-2100669, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021 (Jan. 19, 2021), pp. 1-5, XP051971139, Retrieved from the Internet: URL: https://ftp.3gpp.org/tsg_ran/WG1_RL1/TSGR1_104-e/Docs/R1-2100669.zip, [retrieved on Jan. 19, 2021], Section 4.

International Search Report and Written Opinion—PCT/US2022/070295—ISA/EPO—dated May 2, 2022.

* cited by examiner

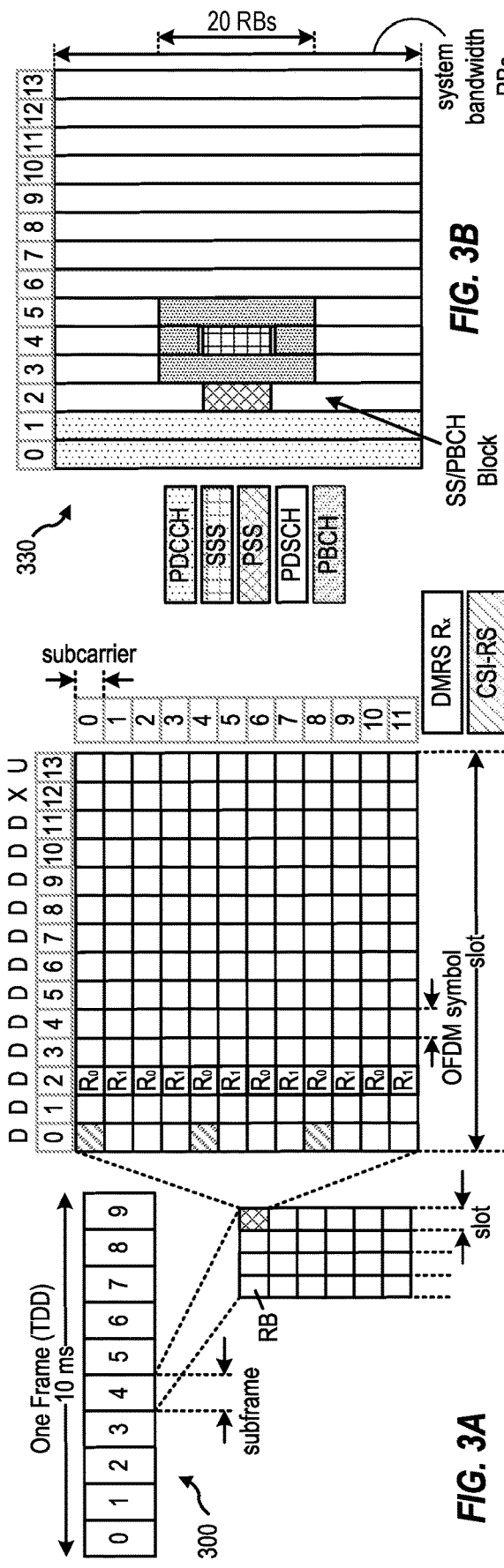
FIG. 3A
FIG. 3B
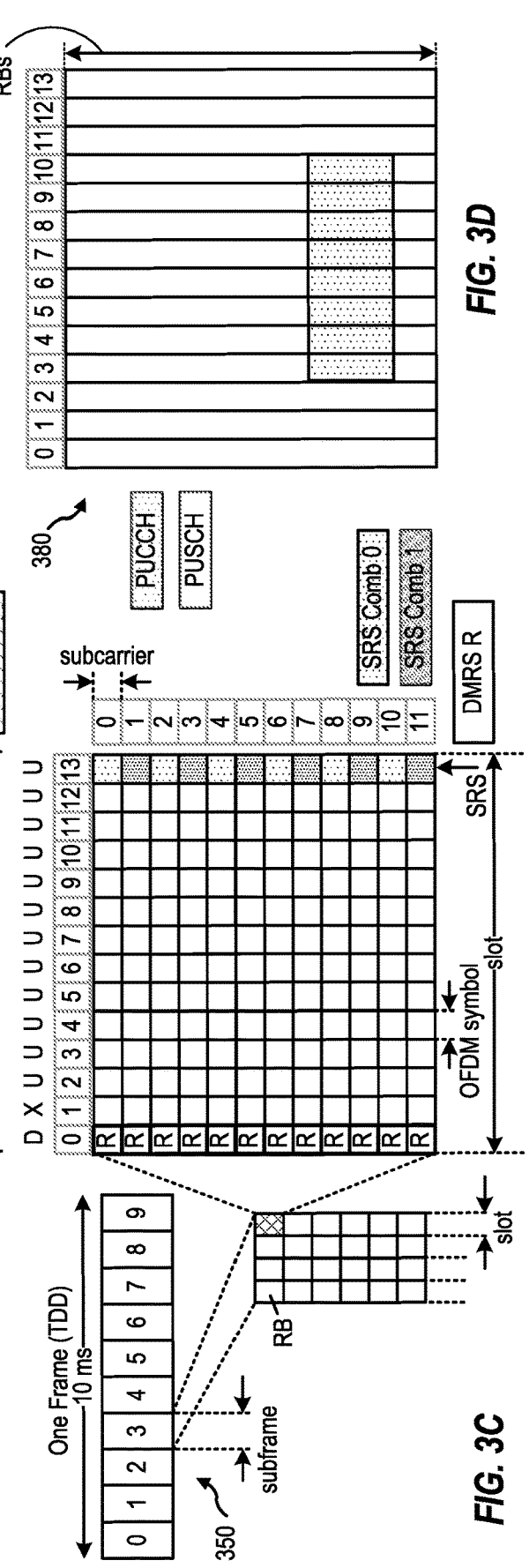
FIG. 3C
FIG. 3D

BUNDLE SIZE CONFIGURATION FOR DEMODULATION REFERENCE SIGNAL BUNDLING IN CASE OF UPLINK RANDOM ACCESS CHANNEL MESSAGE REPETITION

CROSS-REFERENCE TO RELATED APPLICATIONS

This Application claims the benefit of and priority to U.S. Provisional Patent Application No. 63/144,211, filed on Feb. 1, 2021 the entire contents of which are incorporated herein by reference.

BACKGROUND

Aspects of the present disclosure relate to wireless communications, and more particularly, to techniques related to sending uplink random access channel (RACH) messages with repetition to improve coverage.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, such challenges may include challenges in achieving adequate coverage for performing a random access channel (RACH) procedure associated with certain wireless devices. Consequently, there exists a need for further improvements in wireless communications systems to overcome various challenges.

SUMMARY

Certain aspects can be implemented in a method for wireless communications by a user-equipment (UE). The method generally includes determining a bundle size for demodulation reference signal (DMRS) bundling for an uplink random access channel (RACH) message sent with repetition; and transmitting the uplink RACH message to a base station with repetition on multiple slots, with DMRS bundling according to the determined bundle size.

Certain aspects can be implemented in a method for wireless communications by a network entity. The method generally includes determining a bundle size for demodulation reference signal (DMRS) bundling for an uplink random access channel (RACH) message sent from a user equipment (UE) with repetition; receiving the uplink RACH message from the UE sent with repetition on multiple slots; and processing the uplink RACH message based on channel estimation performed considering DMRS sent in at least some of the multiple slots according to the determined bundle size.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide systems and methods for determining a bundle size for demodulation reference signal (DMRS) bundling for an uplink random access channel (RACH) message sent with repetition. For example, in some cases, a user equipment (UE) may be configured to determine a bundle size for DMRS bundling when sending an uplink RACH message (e.g., a MSG3) with repetition and to transmit the uplink RACH message with DMRS bundling according to the determined bundle size.

The use of repetition may enhance coverage, for example, allowing a base station (e.g., gNB) to perform combining of signals received over multiple repetitions and increase chances of successful decoding. Bundling DMRS, where a same or coherent DMRS is sent in multiple time slots, may also enhance coverage, allowing the base station to consider multiple DMRS when performing channel estimation. The enhanced channel estimating may further improve the chances of successful decoding of the uplink RACH transmission.

Very often, some, but not all UEs, have the capability to transmit random access channel (RACH) message with repetition and demodulation reference signal (DMRS) bundling. In such cases, a network entity, such as a base station (e.g., a gNB), may configure the UE with a bundling size for DMRS bundling with uplink RACH messages sent with repetition. The techniques disclosed herein provide flexible and efficient mechanisms for signaling such configuration information to a UE.

Introduction to Wireless Communication Networks

Figure 1:
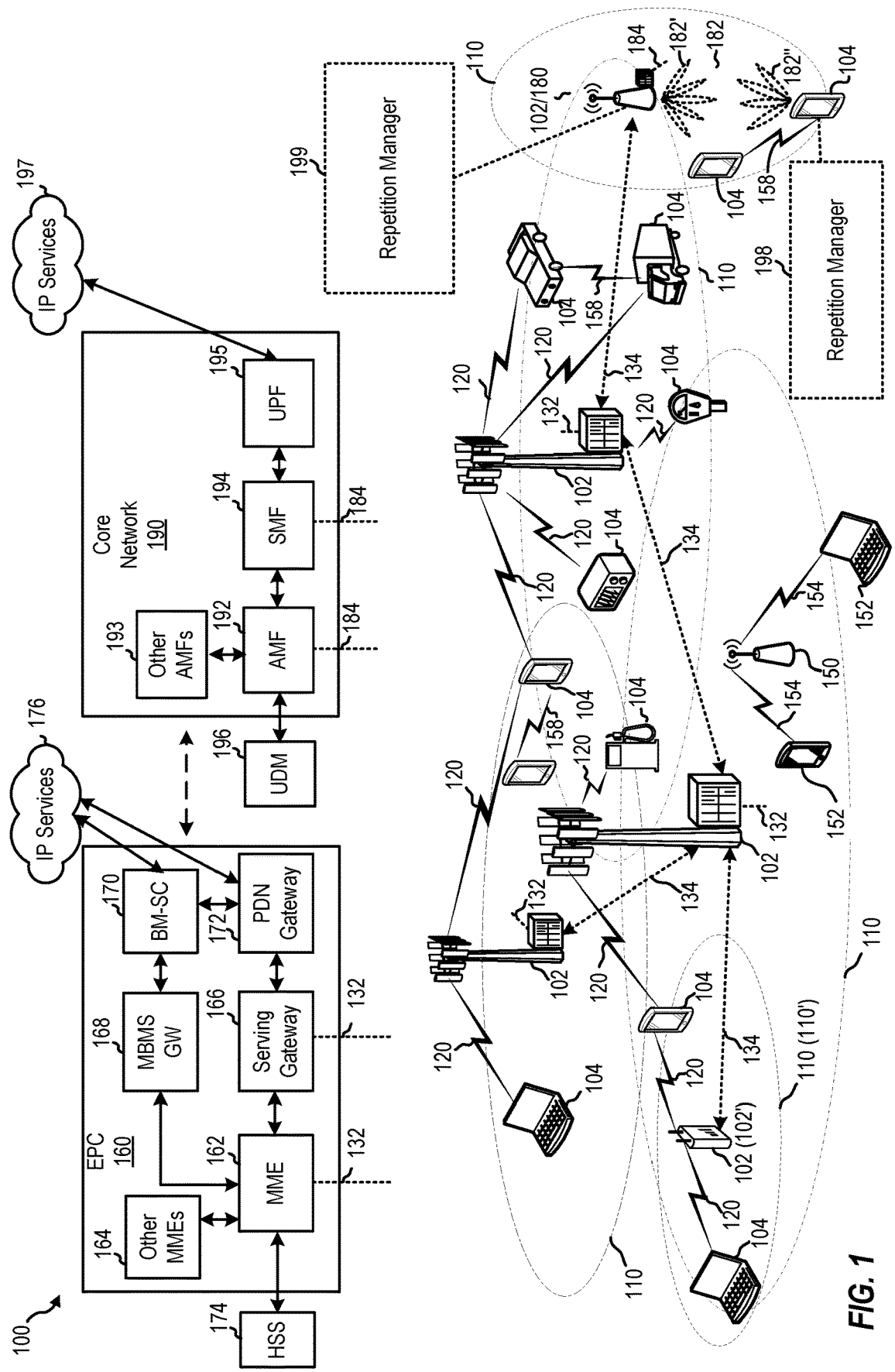
FIG. 1 is a block diagram conceptually illustrating an example wireless communication network.

FIG. 1 depicts an example of a wireless communications system 100, in which aspects described herein may be implemented.

Generally, wireless communication network 100 includes various network entities (alternatively, network elements or network nodes), which are generally manageable logical entities associated with, for example, a communication device and/or a communication function associated with a communication device. For example, various functions of a network as well as various devices associated with and interacting with a network may be considered network entities.

Generally, wireless communications system 100 includes base stations (BSs) 102, user equipments (UEs) 104, and one or more core networks, such as an Evolved Packet Core (EPC) 160 and 5G core network (5GC) 190, which interoperate to provide wireless communications services.

Base stations 102 may provide an access point to the EPC 160 and/or core network 190 for a user equipment (UE) 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, Node B, eNB, an access point, a base transceiver station, a radio base station, a radio transceiver, or a transceiver function, or a transmit reception point (TRP) in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

A base station 102 in the wireless communication network 100 may include a repetition manager 199 (e.g., an uplink RACH message repetition manager), which may determine a bundle size for DMRS bundling for an uplink RACH message sent with repetition. The repetition manager 199 may be configured to perform the operation 600 shown in FIG. 6, as well as other operations described herein for determining a bundling size. Additionally, a UE 104 in the wireless network 100 may include a repetition manager 198 (e.g., an uplink RACH message repetition manager), which may be configured to perform operations 500 shown in FIG. 5, as well as other operations described herein for determining a bundle size.

Figure 2:
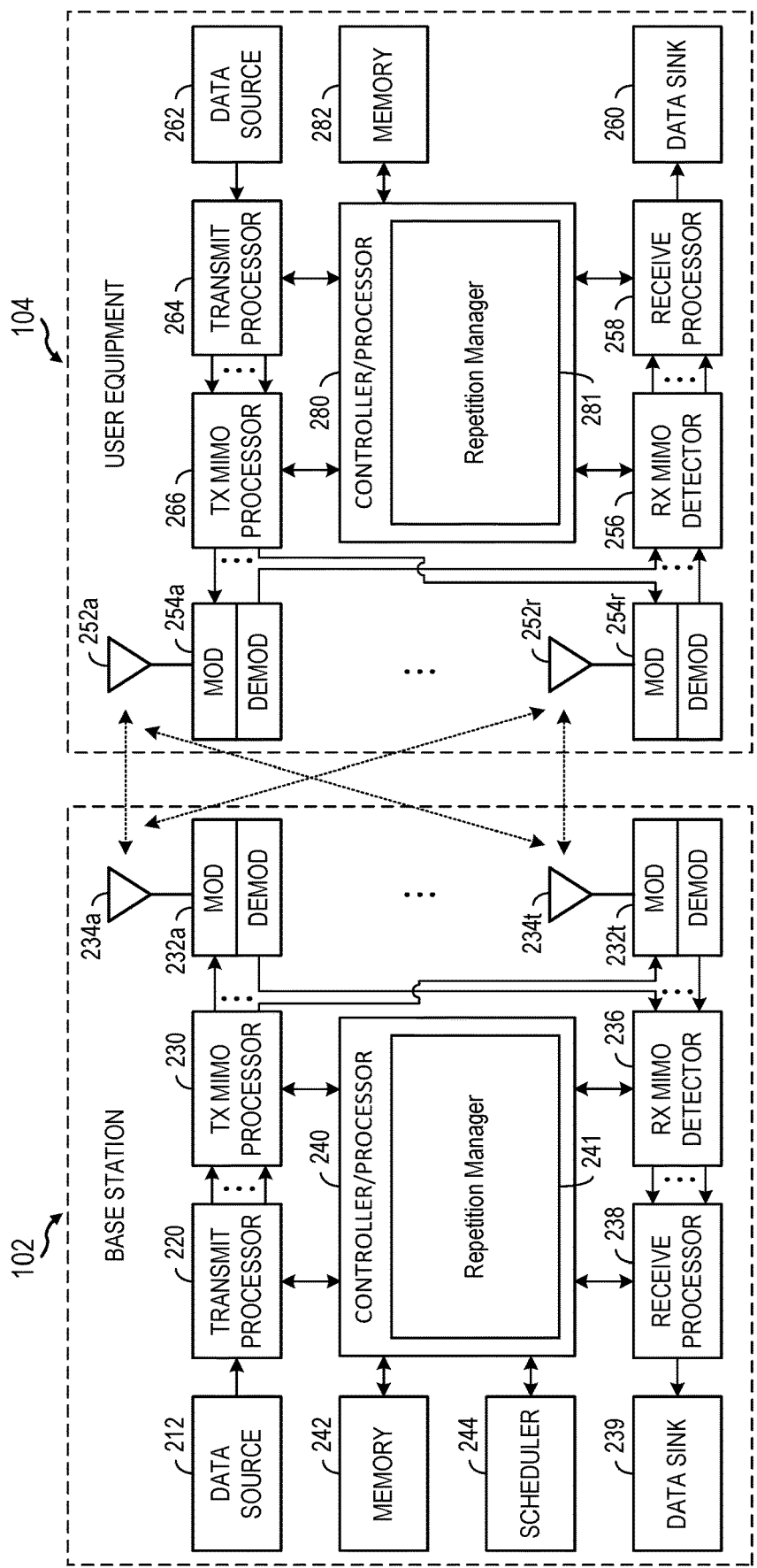
FIG. 2 is a block diagram conceptually illustrating aspects of an example a base station and user equipment.

FIG. 2 depicts aspects of an example base station (BS) 102 and a user equipment (UE) 104.

Generally, BS 102 includes various processors (e.g., 220, 230, 238, and 240), antennas 234a-t, transceivers 232a-t, and other aspects, which are involved in transmission of data (e.g., source data 212) and reception of data (e.g., data sink 239). For example, BS 102 may send and receive data between itself and UE 104. BS 102 includes controller/processor 240, which comprises repetition manager 241 (e.g., an uplink RACH message repetition manager). The repetition manager 241 may be configured to implement the repetition manager 199 of FIG. 1.

BS 102 includes controller/processor 240, which may be configured to implement various functions related to wireless communications. In the depicted example, controller/processor 240 includes the repetition manager 241. Notably, while depicted as an aspect of controller/processor 240, the repetition manager 241 may be implemented additionally or alternatively in various other aspects of base station 102 in other implementations.

Generally, UE 104 includes various processors (e.g., 258, 264, 266, and 280), antennas 252a-r, transceivers 254a-r, and other aspects, involved in transmission of data (e.g., source data 262) and reception of data (e.g., data sink 260). UE 104 includes controller/processor 280, which comprises repetition manager 281 (e.g., an uplink RACH message repetition manager). The repetition manager 281 may be configured to implement the repetition manager 198 of FIG. 1.

User equipment 104 includes controller/processor 280, which may be configured to implement various functions related to wireless communications. In the depicted example, controller/processor 280 includes the repetition manager 281. Notably, while depicted as an aspect of controller/processor 280, repetition manager 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations-FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Communications using the mmWave/near mmWave radio frequency band (e.g., 3 GHz-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Example RACH Procedure

A random-access channel (RACH) is so named because it refers to a wireless channel (medium) that may be shared by multiple UEs and used by the UEs to (randomly) access the network for communications. For example, the RACH may be used for call setup and to access the network for data transmissions. In some cases, RACH may be used for initial access to a network when the UE switches from a radio resource control (RRC) connected idle mode to active mode, or when handing over in RRC connected mode. Moreover, RACH may be used for downlink (DL) and/or uplink (UL) data arrival when the UE is in RRC idle or RRC inactive modes, and when reestablishing a connection with the network.

Figure 4:
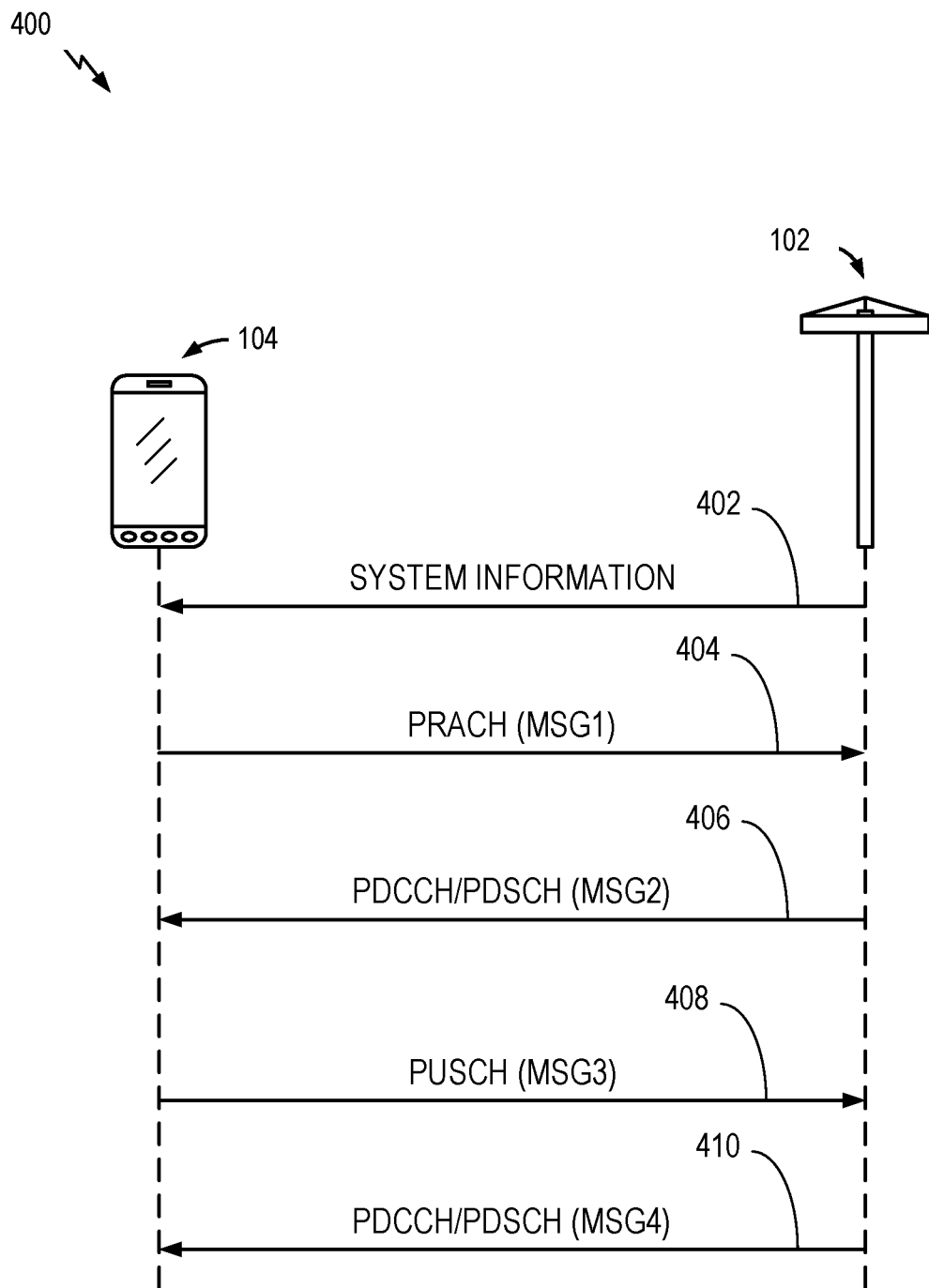
FIG. 4 is a call-flow diagram illustrating an example four-step random access channel (RACH) procedure, in accordance with certain aspects of the present disclosure.

FIG. 4 is a call-flow diagram 400 illustrating an example four-step RACH procedure, in accordance with certain aspects of the present disclosure. A first message 404 (MSG1) may be sent from the UE 104 to BS 102 on the physical random access channel (PRACH). In this case, MSG1 may only include a RACH preamble. BS 102 may respond with a random access response (RAR) message 406 (MSG2), which may include the identifier (ID) of the RACH preamble, a timing advance (TA), an uplink grant, cell radio network temporary identifier (C-RNTI), and a back off indicator (BI). MSG2 406 may further include a PDCCH communication including control information for (e.g., scheduling a reception of) a following communication on the PDSCH, as illustrated. In response to MSG2 406, MSG3 408 is transmitted from the UE 104 to BS 102 on the PUSCH. MSG3 408 may include one or more of an RRC connection request, a tracking area update request, a system information request, a positioning fix or positioning signal request, or a scheduling request. The BS 102 then responds with MSG4 410, which may include a contention resolution message. In some cases, the UE 104 may also receive system information 402 (e.g., also referred to herein as a system information message) indicating various communication parameters that may be used by the UE 104 for communicating with the BS 102.

Aspects Related to DMRS Bundling

In some aspects, repetition may be implemented for PUSCH transmissions to enhance coverage, such as for MSG3 of a RACH procedure as depicted in of FIG. 4. Repetition of a channel generally refers to a technique where multiple repetitions of a channel are transmitted, allowing a receiver to combine the repetitions to facilitate decoding of the channel. In other words, each repetition of the channel may include the same data. Thus, the receiver is able to combine the repetitions to more reliably decode the data associated with the channel. In some aspects, the repetitions may include the same data, yet different redundancy versions. In other words, the same data may encoded differently for the repetitions using different redundancy versions.

Aspects of the present disclosure provide systems and methods for determining a bundle size for demodulation reference signal (DMRS) bundling for an uplink random access channel (RACH) message sent with repetition. Bundling DMRS, e.g., where a same or coherent DMRS is sent in multiple time slots, may also enhance coverage, allowing the base station to consider multiple DMRSs when performing channel estimation. The enhanced channel estimating may further improve the chances of successfully decoding the uplink RACH transmission (e.g., MSG 3 408 in FIG. 4).

In some aspects, a user equipment (UE) may be configured to determine a bundle size for DMRS bundling when sending an uplink RACH message (e.g., a MSG3) with repetition and to transmit the uplink RACH message with DMRS bundling according to the determined bundle size.

For DMRS bundling of PUSCH repetitions, assuming K repetition, there could be one or multiple DMRS bundle intervals to cover the K repetitions. In some aspects, for unicast PUSCH, the size of bundle interval can be configured via radio resource control (RRC) signaling, via downlink control (DCI), or can be a function of K.

For uplink RACH messages sent with repetition (e.g., MSG3), however, such configuration may not be available for a UE that has yet to establish an RRC connection with the network. Aspects of the present disclosure overcome this issue and provide techniques that allow a UE to determine the DMRS bundle size for uplink RACH messages sent with repetition and DMRS bundling.

Figure 5:
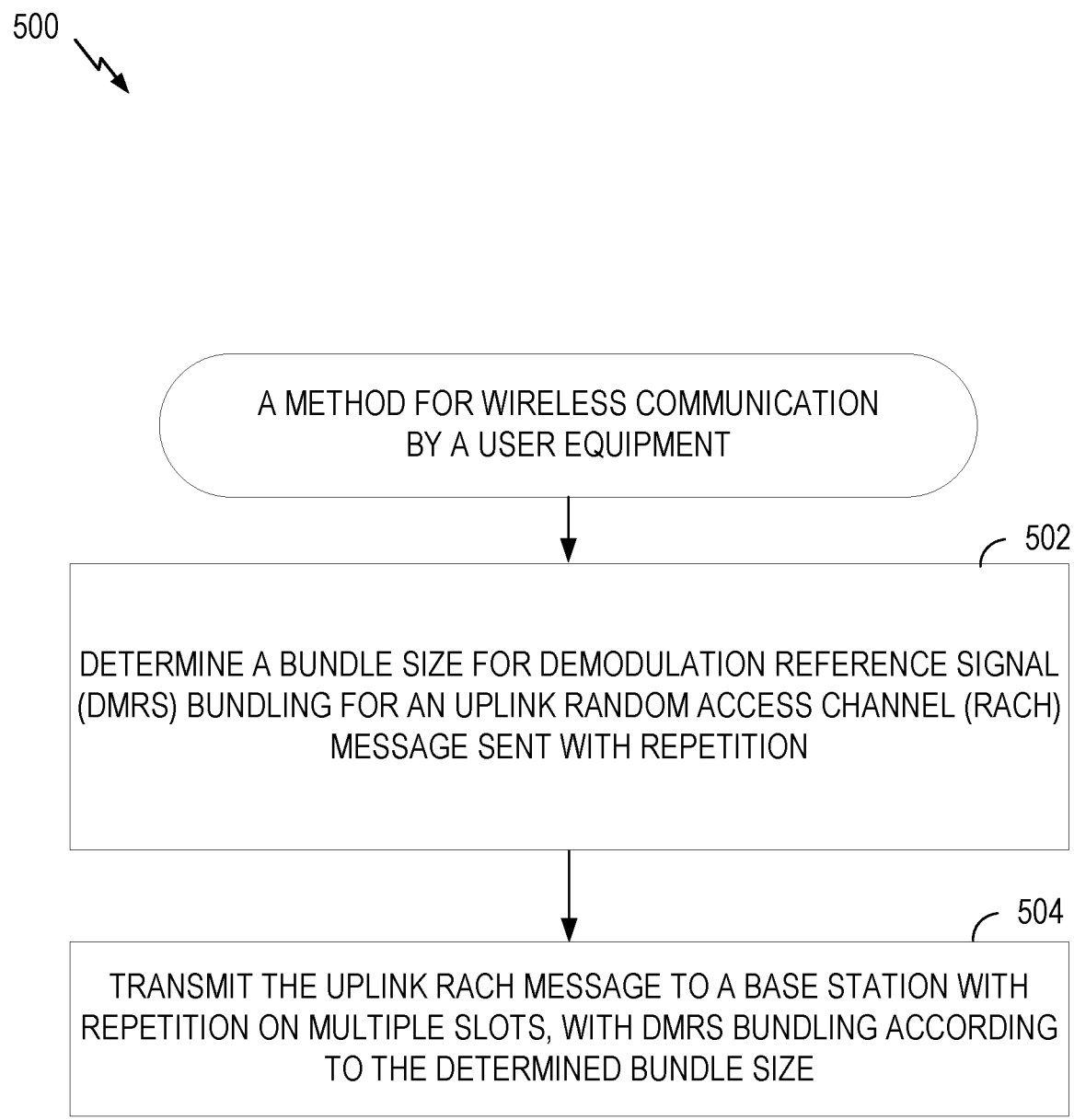
FIG. 5 is a flow diagram illustrating example operations for wireless communication, in accordance with certain aspects of the present disclosure.

FIG. 5 is a flow diagram illustrating example operations 500 for wireless communication by a UE, in accordance with certain aspects of the present disclosure. The operations 500 may be performed, for example, by a UE (e.g., such as the UE 104 in the wireless communication system 100). The operations 500 may be implemented as software components that are executed and run on one or more processors (e.g., controller/processor 280 of FIG. 2, and in some cases repetition manager 281). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 begin, at block 502, by determining a bundle size for demodulation reference signal (DMRS) bundling for an uplink random access channel (RACH) message sent with repetition.

At block 504, the UE transmits the uplink RACH message to a base station with repetition on multiple slots, with DMRS bundling according to the determined bundle size.

The bundling size may be determined in various manners. In some aspects, the DMRS bundle size may be determined as a function of the number of repetitions of the uplink RACH message (e.g., MSG3 as in FIG. 4). In some aspects, the bundle size may be determined, at least in part, based on an operating band and/or based on a multiplexing mode. For example, different bundling sizes may be determined for time division duplexing (TDD) and frequency division duplexing (FDD) modes. In some cases, bundle size may be a function of the number of repetitions, K.

In some aspects, the bundle size is determined, at least in part, based on signaling from the base station. Such signaling may include at least one of system information (e.g., via a system information block or SIB), a downlink RACH message (e.g., a MSG2/RAR), or a physical downlink control channel (PDCCH) for the downlink RACH message. In some cases, the bundling size may be configured, at least partially, via a SIB1, RAR message, or a DCI format 1_0 with a cyclic redundancy check (CRC) scrambled by a radio network temporary identifier (e.g., a random access RNTI or RA-RNTI).

Figure 6:
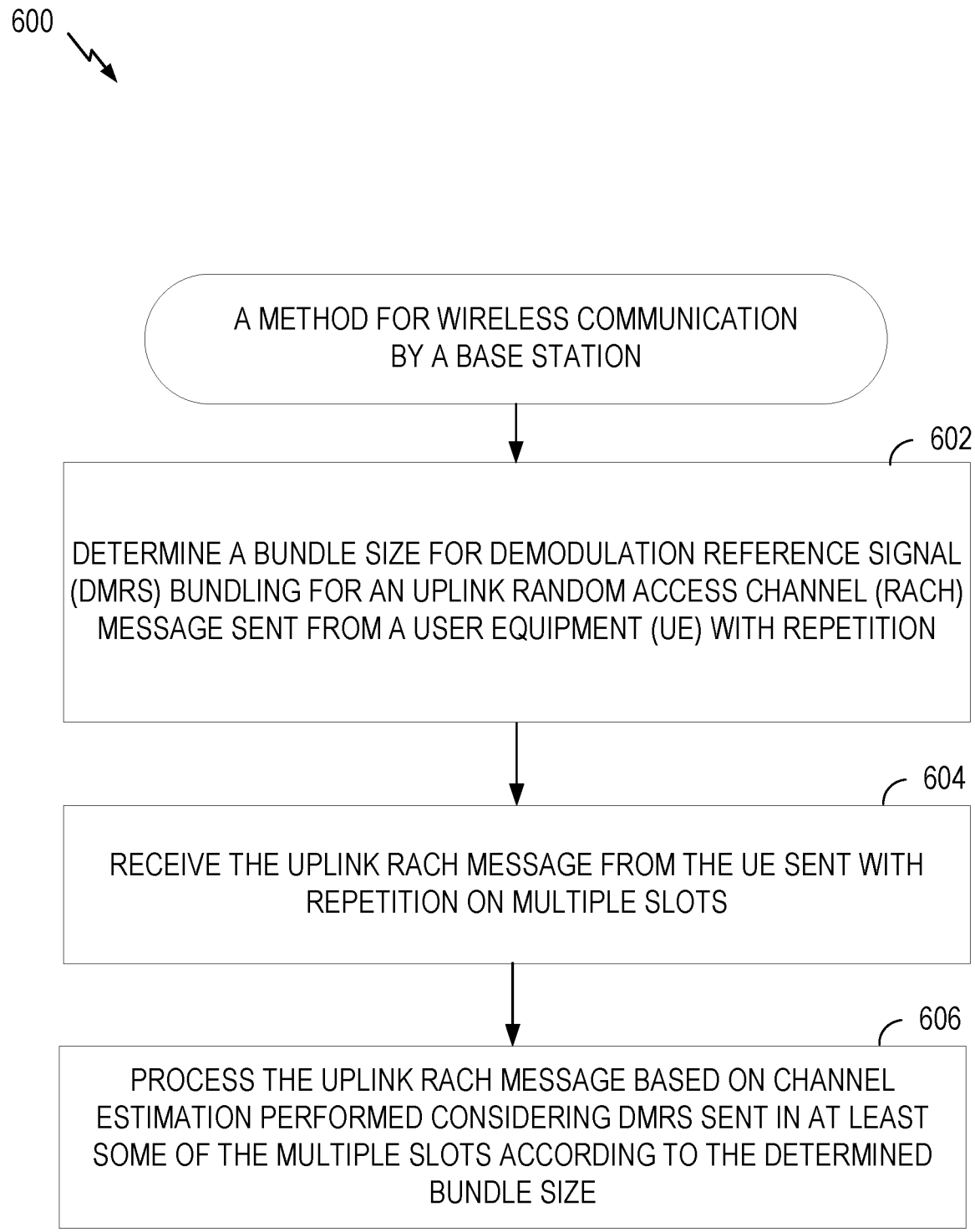
FIG. 6 is a flow diagram illustrating example operations for wireless communication, in accordance with certain aspects of the present disclosure.

FIG. 6 is a flow diagram illustrating example operations 600 that may be considered complementary to operations 500 of FIG. 5. For example, operations 600 may be performed by a BS (e.g., such as the BS 102 in the wireless communication network 100) performing a RACH procedure with a UE performing operations 500 of FIG. 5. The operations 600 may be implemented as software components that are executed and run on one or more processors (e.g., controller/processor 240 of FIG. 2, including repetition manager 241). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 begin, at block 602, by determining a bundle size for demodulation reference signal (DMRS) bundling for an uplink random access channel (RACH) message sent from a user equipment (UE) with repetition.

At block 604, the BS receives the uplink RACH message from the UE sent with repetition on multiple slots.

At block 606, the BS processes the uplink RACH message based on channel estimation performed considering DMRS sent in at least some of the multiple slots according to the determined bundle size.

Figure 7:
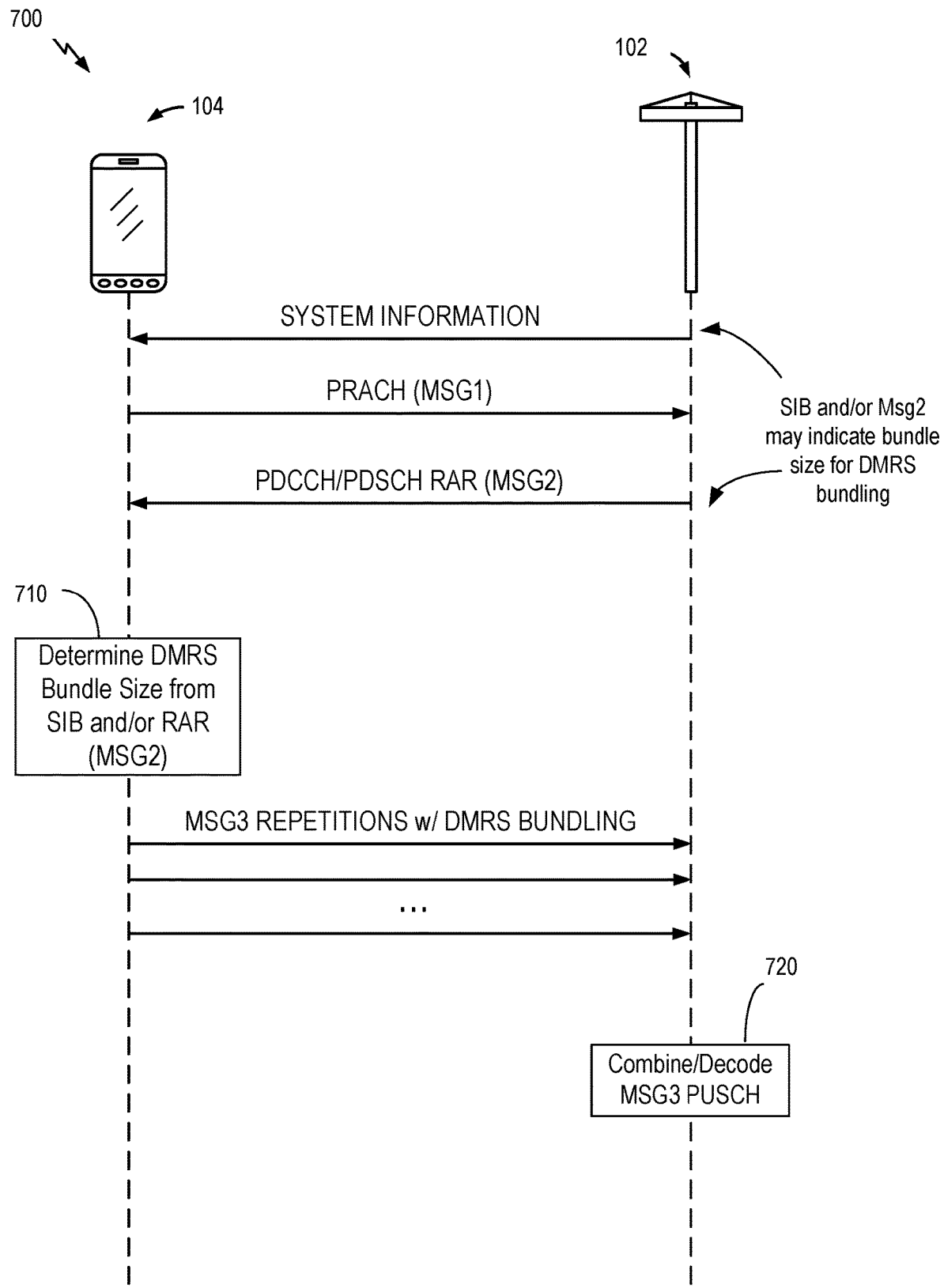
FIG. 7 is a call flow diagram illustrating example techniques for physical uplink shared channel (PUSCH) repetition during a RACH procedure, in accordance with certain aspects of the present disclosure.

Operations 500 and 600 of FIGS. 5 and 6 may be depicted in one example with reference to the call flow diagram 700 of FIG. 7. In some aspects, a BS 102 may configure a UE 104 for sending MSG3 PUSCH repetitions via system information. The UE 104 may also be configured to perform DMRS bundling when sending the MSG3 PUSCH repetitions to BS 102.

As illustrated, the BS 102 may indicate a bundle size for DMRS bundling via system information, a RAR (MSG2), and/or a PDCCH for the RAR. At 710, the UE 104 determines the bundle size from the system information, RAR (MSG2), and/or the PDCCH for the RAR. The UE 104 may then transmit the MSG3 repetitions with DMRS bundling according to the determined bundle size to BS 102.

At 720, the BS 102 combines and decodes the MSG3 transmission, for example, based on channel estimation performed using the bundled DMRS. In other words, the bundle size may indicate how many of those repetitions with DMRS on different slots are considered together for channel estimation. The bundle size (how many repetitions are bundled together) could be indicated in terms of a number of slots or a number of repetitions.

In some cases, bundling size for DMRS bundling may also depend on whether a MSG3 sent with repetition is an initial transmission or a retransmission. In other words, there may be a relation between DMRS bundle sizes for an initial transmission and a retransmission.

Figure 8:
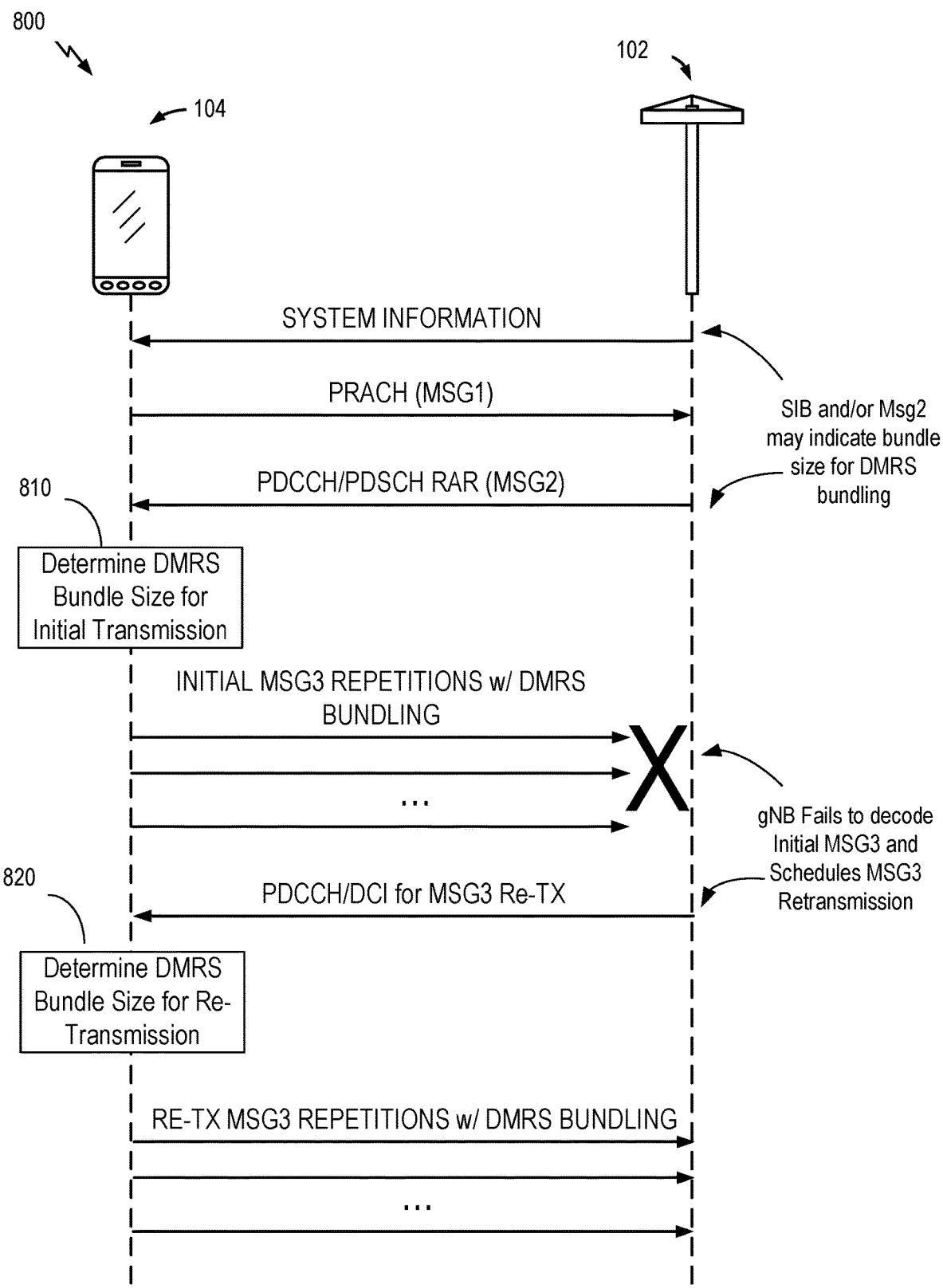
FIG. 8 is a call flow diagram illustrating example techniques for retransmission of a physical uplink shared channel (PUSCH) repetition during a RACH procedure, in accordance with certain aspects of the present disclosure.

As illustrated in the call flow diagram 800 of FIG. 8, in initial transmission of MSG3 with repetition may be sent by UE 104 using a first DMRS bundle size (e.g., determined at 810 in one of the manners described above). This initial transmission may not be successfully decoded by the BS 102, despite the DMRS bundling and repetition. Therefore, the BS 102 may schedule a retransmission.

At 820, the UE 104 determines a DMRS bundle size for this retransmission and retransmits the MSG3 repetitions with DMRS bundling to BS 102, according to this determined DMRS bundle size.

According to a first option, the indication of bundle size for MSG3 with repetition, as described above, may be applied to both initial and retransmission. According to a second option, the DMRS bundling configuration may be reconfigured for retransmission (e.g., via a DCI format 0_0 scrambled by TC-RNTI scheduling the retransmission).

In some cases, the reconfiguration may be in relation to the bundle size for the original MSG3. For example, a larger or scaled bundle size may be used for retransmission (e.g., twice the bundle size may be indicated). As another example, the bundle size may be increased proportional to an increase in a number of MSG3 repetitions (e.g., the initial transmission may have 4 repetitions and a bundling size of 2, while the retransmission may have 8 repetitions and a bundling size of 4).

Example Wireless Communication Devices

Figure 9:
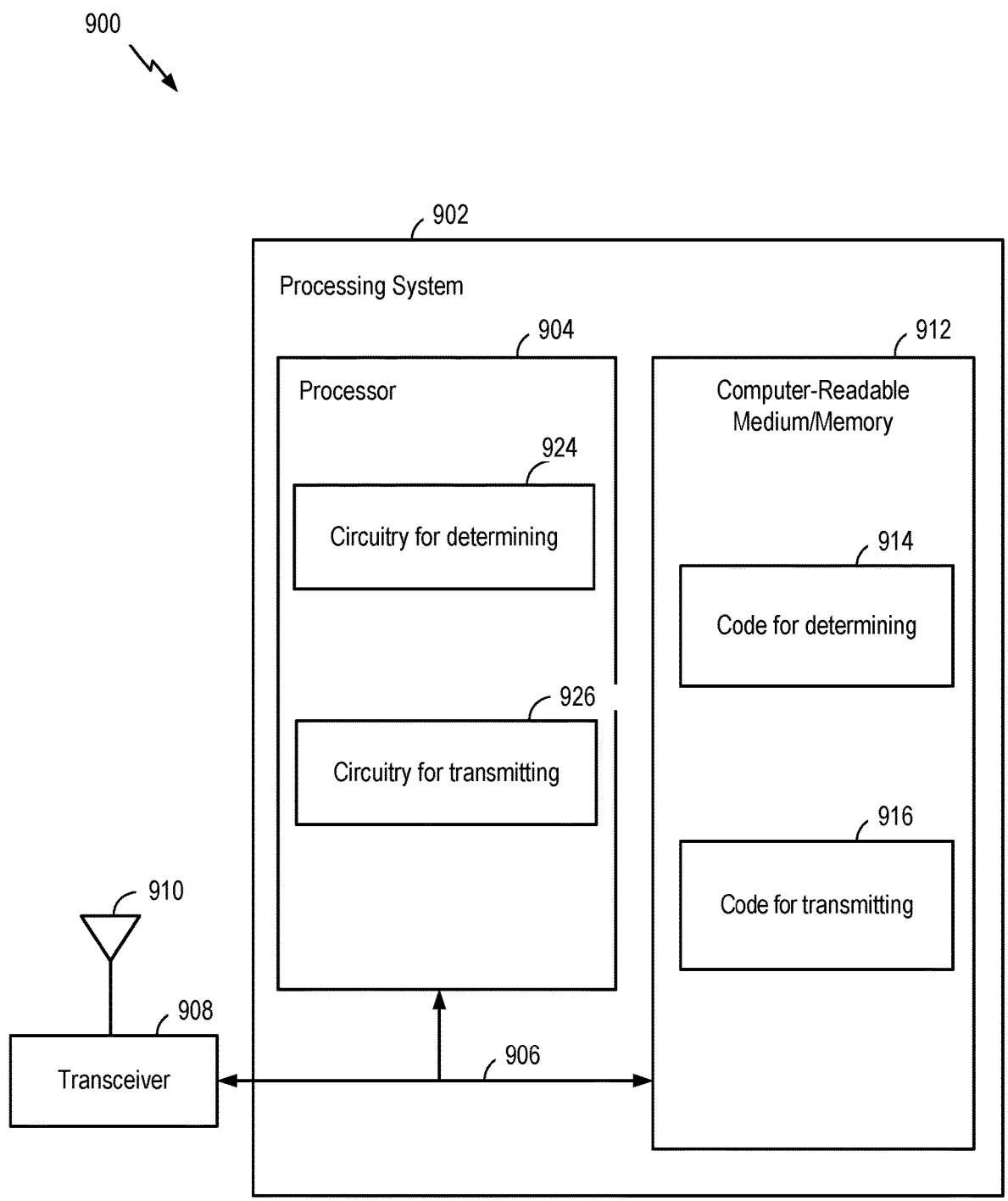
FIG. 9 illustrates an example wireless communications device, or part thereof, that is operable, configured, or adapted to perform operations for the methods disclosed herein, in accordance with certain aspects of the present disclosure.

FIG. 9 depicts an example communications device 900 that includes various components operable, configured, or adapted to perform operations for the techniques disclosed herein, such as the operations 500 depicted and described with respect to FIG. 5. In some examples, communication device 900 may be a UE 104 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 904 coupled to a computer-readable medium/memory 912 via a bus 906. In certain aspects, computer-readable medium/memory 912 is configured to store instructions (e.g., computer-executable code) that when executed by the one or more processors 904, cause the one or more processors 904 to perform the operations illustrated in FIG. 5, or other operations for performing the various techniques discussed herein for channel repetition.

In the depicted example, computer-readable medium/memory 912 stores code 914 for determining and code 916 for transmitting.

In some cases, code 914 for determining includes code for determining a bundle size for demodulation reference signal (DMRS) bundling for an uplink random access channel (RACH) message sent with repetition, such as described with respect to FIG. 5.

In some cases, code 916 for transmitting includes code for transmitting the uplink RACH message to a base station with repetition on multiple slots, with DMRS bundling according to the determined bundle size, such as described with respect to FIG. 5.

In the depicted example, the one or more processors 904 include circuitry configured to implement the code stored in the computer-readable medium/memory 904, including circuitry 924 for determining and circuitry 926 for transmitting.

In some cases, circuitry 924 for determining includes circuitry for determining a bundle size for DMRS bundling for an uplink RACH message sent with repetition.

In some cases, circuitry 926 for transmitting includes circuitry for transmitting the uplink RACH message to a base station with repetition on multiple slots, with DMRS bundling according to the determined bundle size.

Various components of communications device 900 may provide means for performing the methods described herein, including with respect to operations 500 of FIG. 5.

In some examples, means for transmitting or sending (or means for outputting for transmission) may include the transceivers 254 and/or antenna(s) 252 of the UE 104 illustrated in FIG. 2 and/or transceiver 908 and antenna 910 of the communication device 900 in FIG. 9.

In some examples, means for receiving (or means for obtaining) may include the transceivers 254 and/or antenna(s) 252 of the UE 104 illustrated in FIG. 2 and/or transceiver 908 and antenna 910 of the communication device 900 in FIG. 9.

In some examples, means for determining and means for transmitting may include various processing system components, such as: the one or more processors 920 in FIG. 9, or aspects of the UE 104 depicted in FIG. 2, receive processor 258, transmit processor 264, TX MIMO processor 266, and/or controller/processor 280 (including repetition manager 281).

Notably, FIG. 9 is just use example, and many other examples and configurations of communication device 900 are possible.

Figure 10:
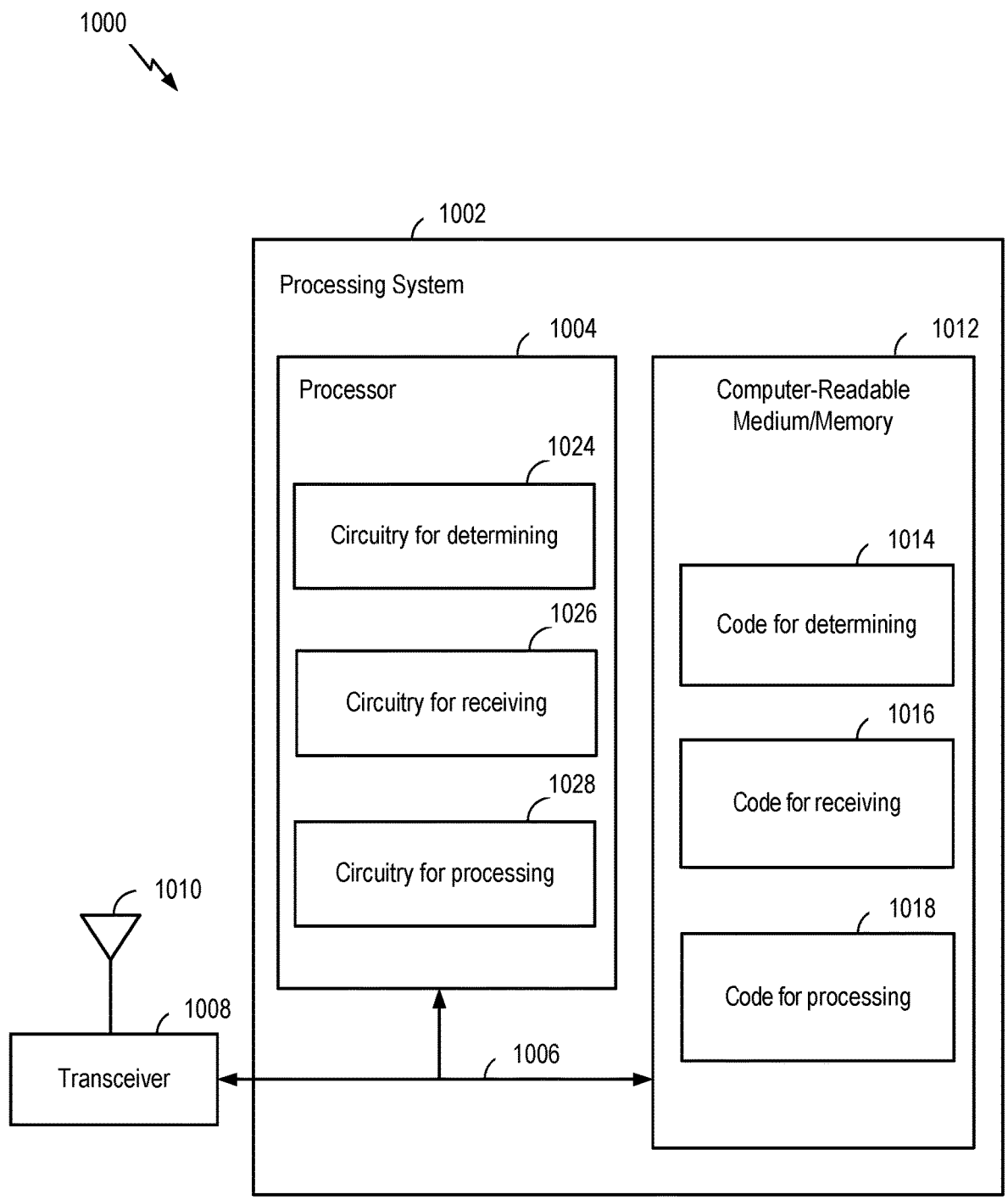
FIG. 10 illustrates an example wireless communications device, or part thereof, that is operable, configured, or adapted to perform operations for the methods disclosed herein, in accordance with certain aspects of the present disclosure.

FIG. 10 depicts an example communications device 1000 that includes various components operable, configured, or adapted to perform operations for the techniques disclosed herein, such as the operations depicted and described with respect to FIG. 6. In some examples, communication device 1000 may be a BS 102 as described, for example with respect to FIGS. 1 and 2.

Communications device 1000 includes a processing system 1002 coupled to a transceiver 1008 (e.g., a transmitter and/or a receiver). Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1004 coupled to a computer-readable medium/memory 1012 via a bus 1006. In certain aspects, computer-readable medium/memory 1012 is configured to store instructions (e.g., computer-executable code) that when executed by the one or more processors 1004, cause the one or more processors 1004 to perform the operations illustrated in FIG. 6, or other operations for performing the various techniques discussed herein for channel repetition.

In the depicted example, computer-readable medium/ memory 1012 stores code 1014 for determining, code 1016 for receiving, and code 1018 for processing.

In some cases, code 1014 for determining includes code for determining a bundle size for DMRS bundling for an uplink RACH message sent from a UE with repetition, such as described with respect to FIG. 6.

In some cases, code 1016 for receiving includes code for receiving the uplink RACH message from the UE sent with repetition on multiple slots, such as described with respect to FIG. 6.

In some cases, code 1018 for processing includes code for processing the uplink RACH message based on channel estimation performed considering DMRS sent in at least some of the multiple slots according to the determined bundle size, such as described with respect to FIG. 6.

In the depicted example, the one or more processors 1004 include circuitry configured to implement the code stored in the computer-readable medium/memory 1012, including circuitry 1024 for determining, circuitry 1026 for receiving, and circuitry for processing.

In some cases, circuitry 1024 for determining includes circuitry for determining a bundle size for DMRS bundling for an uplink RACH message sent from a UE with repetition.

In some cases, circuitry 1026 for receiving includes circuitry for receiving the uplink RACH message from the UE sent with repetition on multiple slots.

In some cases, circuitry 1028 for processing includes circuitry for processing the uplink RACH message based on channel estimation performed considering DMRS sent in at least some of the multiple slots according to the determined bundle size.

Various components of communications device 1000 may provide means for performing the methods described herein, including with respect to operations 600 of FIG. 6.

In some examples, means for transmitting or sending (or means for outputting for transmission) may include the transceivers 232 and/or antenna(s) 234 of the base station 102 illustrated in FIG. 2 and/or transceiver 1008 and antenna 1010 of the communication device 1000 in FIG. 10.

In some examples, means for receiving (or means for obtaining) may include the transceivers 232 and/or antenna(s) 234 of the base station illustrated in FIG. 2 and/or transceiver 1008 and antenna 1010 of the communication device 1000 in FIG. 10.

In some examples, means for determining, means for receiving, and means for processing may include various processing system components, such as: the one or more processors 1004 in FIG. 10, or aspects of the BS 102 depicted in FIG. 2, including receive processor 238, transmit processor 220, TX MIMO processor 230, and/or controller/ processor 240 (including repetition manager 241).

Notably, FIG. 10 is just use example, and many other examples and configurations of communication device 1000 are possible.

Example Clauses

Implementation examples are described in the following numbered clauses:

Clause 1: A method for wireless communications by a user-equipment (UE), comprising: determining a bundle size for demodulation reference signal (DMRS) bundling for an uplink random access channel (RACH) message sent with repetition; and transmitting the uplink RACH message to a base station with repetition on multiple slots, with DMRS bundling according to the determined bundle size.

Clause 2: The method of Clause 1, wherein the uplink RACH message is sent with a number of repetitions; and the bundle size is determined as a function of the number of repetitions.

Clause 3: The method of any one of Clause 1 or 2, further comprising determining the number of repetitions based on at least one of system information, a downlink RACH message, or a physical downlink control channel (PDCCH) for the downlink RACH message.

Clause 4: The method of any one of Clauses 1-3, wherein the bundle size is determined, at least in part, based on an operating band.

Clause 5: The method of any one of Clauses 1-3, wherein the bundle size is determined, at least in part, based on a duplexing mode in which the UE is operating.

Clause 6: The method of any one of Clauses 1-3, wherein the bundle size is determined, at least in part, based on signaling from the base station.

Clause 7: The method of Clause 6, wherein the signaling comprises at least one of system information, a downlink RACH message, or a physical downlink control channel (PDCCH) for the downlink RACH message.

Clause 8: The method of any one of Clauses 1-7, wherein, the uplink RACH message comprises a retransmission of an initial transmission of the uplink RACH message.

Clause 9: The method of Clause 8, wherein a same bundle size is applied to both the initial transmission of the uplink RACH message and the retransmission of the uplink RACH message.

Clause 10: The method of Clause 8, wherein different bundle sizes are applied to the initial and retransmission of the uplink RACH message.

Clause 11: The method of Clause 10, wherein the bundle size applied to the retransmission of the uplink RACH message is relative to the bundle size applied to the initial transmission of the uplink RACH message.

Clause 12: A method for wireless communications by a network entity, comprising: determining a bundle size for demodulation reference signal (DMRS) bundling for an uplink random access channel (RACH) message sent from a user equipment (UE) with repetition; receiving the uplink RACH message from the UE sent with repetition on multiple slots; and processing the uplink RACH message based on channel estimation performed considering DMRS sent in at least some of the multiple slots according to the determined bundle size.

Clause 13: The method of Clause 12, wherein the uplink RACH message is sent with a number of repetitions; and the bundle size is determined as a function of the number of repetitions.

Clause 14: The method of any one of Clause 12 or 13, further comprising signaling the UE an indication of the number of repetitions via at least one of system information, a downlink RACH message, or a physical downlink control channel (PDCCH) for the downlink RACH message.

Clause 15: The method of any one of Clauses 12-14, wherein the bundle size is determined, at least in part, based on an operating band.

Clause 16: The method of any one of Clauses 12-14, wherein the bundle size is determined, at least in part, based on a duplexing mode in which the network entity is operating.

Clause 17: The method of any one of Clauses 12-14, wherein the bundle size is determined, at least in part, based on signaling from the base station to the UE.

Clause 18: The method of Clause 17, wherein the signaling comprises at least one of system information, a downlink RACH message, or a physical downlink control channel (PDCCH) for the downlink RACH message.

Clause 19: The method of any one of Clauses 12-18, wherein, the uplink RACH message comprises a retransmission of an initial transmission of the uplink RACH message.

Clause 20: The method of Clause 19, wherein a same bundle size is applied to both the initial transmission of the uplink RACH message and the retransmission of the uplink RACH message.

Clause 21: The method of Clause 19, wherein different bundle sizes are applied to the initial and retransmission of the uplink RACH message.

Clause 22: The method of Clause 21, wherein the bundle size applied to the retransmission of the uplink RACH message is relative to the bundle size applied to the initial transmission of the uplink RACH message.

Clause 23: An apparatus, comprising a memory comprising computer-executable instructions and one or more processors configured to execute the computer-executable instructions and cause the one or more processors to perform a method in accordance with any one of Clauses 1-22.

Clause 24: An apparatus, comprising means for performing a method in accordance with any one of Clauses 1-22.

Clause 25: A non-transitory computer-readable medium comprising computer-executable instructions that, when executed by one or more processors, cause the one or more processors to perform a method in accordance with any one of Clauses 1-22.

Clause 26: A computer program product embodied on a computer-readable storage medium comprising code for performing a method in accordance with any one of Clauses 1-22.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). ABS for a macro cell may be referred to as a macro BS. ABS for a pico cell may be referred to as a pico BS. A BS for a femto cell may be referred to as a femto BS or a home BS.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with core network 190 through second backhaul links 184. Base stations 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be configured to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/ duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DMRS) (indicated as Rx for one particular configuration, where 100x is the port number, but other DMRS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/ symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DMRS (indicated as R for one particular configuration, but other DMRS configurations are possible) for channel estimation at the base station. The UE may transmit DMRS for the physical uplink control channel (PUCCH) and DMRS for the physical uplink shared channel (PUSCH). The PUSCH DMRS may be transmitted in the first one or two symbols of the PUSCH. The PUCCH DMRS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of channel repetition in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment, comprising:
   determining a bundle size for demodulation reference signal (DMRS) bundling for an uplink random access channel (RACH) message sent with repetition; and
   transmitting the uplink RACH message to a base station with repetition on multiple slots, with DMRS bundling according to the determined bundle size,
   wherein the uplink RACH message comprises a retransmission of an initial transmission of the uplink RACH message, and
   wherein a same bundle size is applied to both the initial transmission of the uplink RACH message and the retransmission of the uplink RACH message, or different bundle sizes are applied to the initial transmission of the uplink RACH message and the retransmission of the uplink RACH message.

2. The method of claim 1, wherein:
   the uplink RACH message is sent with a number of repetitions; and
   the bundle size is determined as a function of the number of repetitions.

3. The method of claim 2, further comprising determining the number of repetitions based on at least one of system information, a downlink RACH message, or a physical downlink control channel (PDCCH) for the downlink RACH message.

4. The method of claim 1, wherein the bundle size is determined, at least in part, based on an operating band of the user equipment.

5. The method of claim 1, wherein the bundle size is determined, at least in part, based on a duplexing mode in which the user equipment is operating.

6. The method of claim 1, wherein the bundle size is determined, at least in part, based on signaling from the base station.

7. The method of claim 6, wherein the signaling comprises at least one of system information, a downlink RACH message, or a physical downlink control channel (PDCCH) for the downlink RACH message.

8. The method of claim 1, wherein the same bundle size is applied to both the initial transmission of the uplink RACH message and the retransmission of the uplink RACH message.

9. The method of claim 1, wherein the different bundle sizes are applied to the initial transmission and the retransmission of the uplink RACH message.

10. A user equipment configured for wireless communication, comprising: a memory comprising computer-executable instructions; and one or more processors configured to execute the computer-executable instructions and cause the user equipment to:

determine a bundle size for demodulation reference signal (DMRS) bundling for an uplink random access channel (RACH) message sent with repetition; and transmit the uplink RACH message to a base station with repetition on multiple slots, with DMRS bundling according to the determined bundle size, wherein the uplink RACH message comprises a retransmission of an initial transmission of the uplink RACH message, and wherein the one or more processors are configured to execute the computer-executable instructions and cause the user equipment to apply a same bundle size to both the initial transmission of the uplink RACH message and the retransmission of the uplink RACH message, or apply different bundle sizes to the initial transmission of the uplink RACH message and the retransmission of the uplink RACH message.

11. A non-transitory computer-readable medium comprising computer-executable instructions that, when executed by one or more processors of a user equipment, cause the user equipment to perform a method of wireless communication, comprising:

determining a bundle size for demodulation reference signal (DMRS) bundling for an uplink random access channel (RACH) message sent with repetition; and transmitting the uplink RACH message to a base station with repetition on multiple slots, with DMRS bundling according to the determined bundle size, wherein the uplink RACH message comprises a retransmission of an initial transmission of the uplink RACH message, and wherein a same bundle size is applied to both the initial transmission of the uplink RACH message and the retransmission of the uplink RACH message, or different bundle sizes are applied to the initial transmission of the uplink RACH message and the retransmission of the uplink RACH message.

12. The user equipment of claim 10, wherein:

the uplink RACH message is sent with a number of repetitions; and the bundle size is determined as a function of the number of repetitions.

13. The user equipment of claim 12, wherein the one or more processors are configured to execute the computer-executable instructions and cause the user equipment to determine the number of repetitions based on at least one of system information, a downlink RACH message, or a physical downlink control channel (PDCCH) for the downlink RACH message.

14. The user equipment of claim 10, wherein the one or more processors are configured to execute the computer-executable instructions and cause the user equipment to determine the bundle size, at least in part, based on an operating band of the user equipment.

15. The user equipment of claim 10, wherein the one or more processors are configured to execute the computer-executable instructions and cause the user equipment to determine the bundle size, at least in part, based on a duplexing mode in which the user equipment is configured to operate.

16. The user equipment of claim 10, wherein the one or more processors are configured to execute the computer-executable instructions and cause the user equipment to determine the bundle size, at least in part, based on signaling from the base station.

17. The user equipment of claim 16, wherein the signaling comprises at least one of system information, a downlink RACH message, or a physical downlink control channel (PDCCH) for the downlink RACH message.

18. The user equipment of claim 10, wherein the one or more processors are configured to execute the computer-executable instructions and cause the user equipment to apply the same bundle size to both the initial transmission of the uplink RACH message and the retransmission of the uplink RACH message.

19. The user equipment of claim 10, wherein the one or more processors are configured to execute the computer-executable instructions and cause the user equipment to apply the different bundle sizes to the initial transmission of the uplink RACH message and the retransmission of the uplink RACH message.

20. The non-transitory computer-readable medium of claim 11, wherein the same bundle size is applied to both the initial transmission of the uplink RACH message and the retransmission of the uplink RACH message.

21. The non-transitory computer-readable medium of claim 11, wherein the different bundle sizes are applied to the initial transmission and the retransmission of the uplink RACH message.

* * * * *